United States Patent Office 3,228,265
Patented Jan. 11, 1966

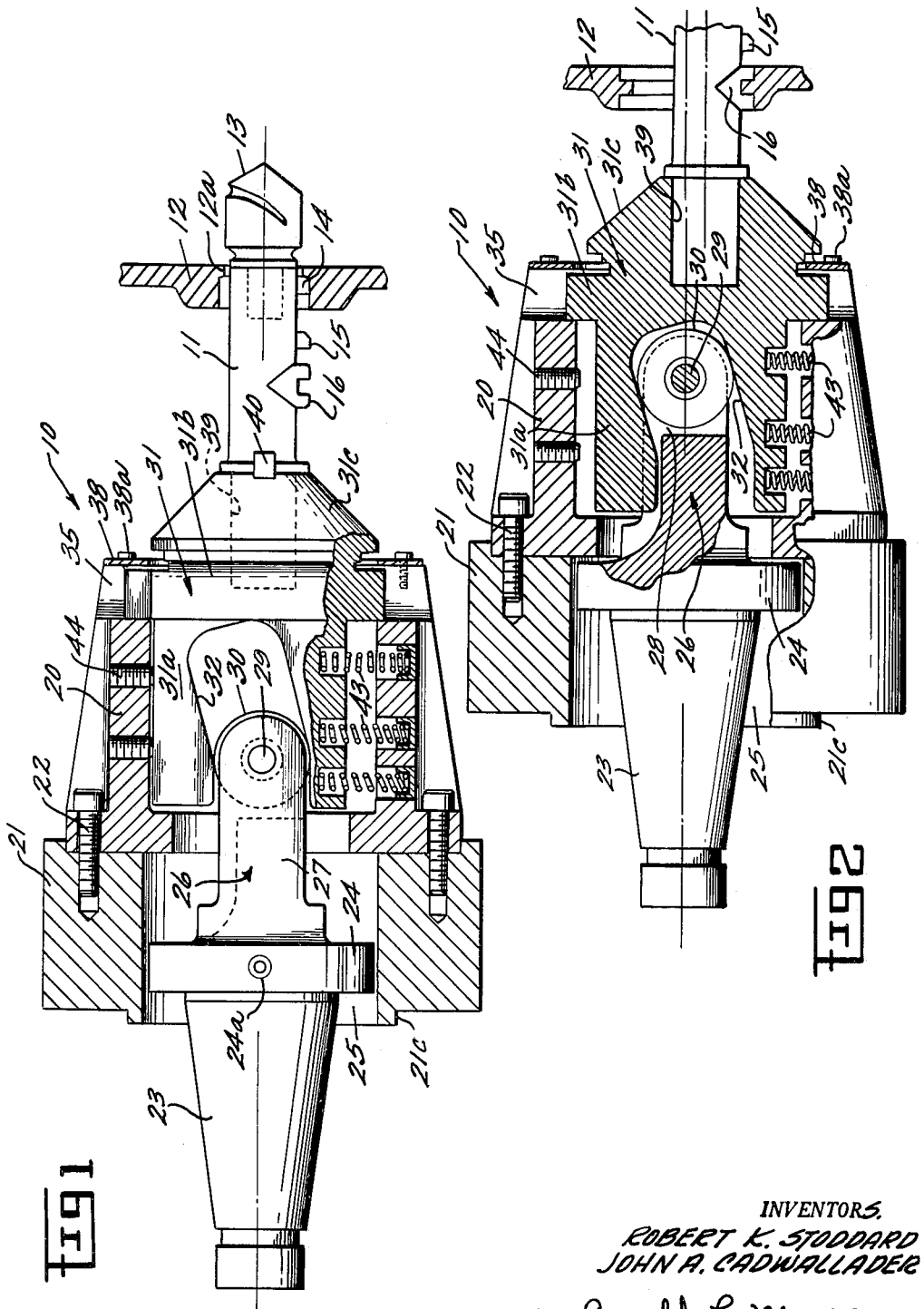

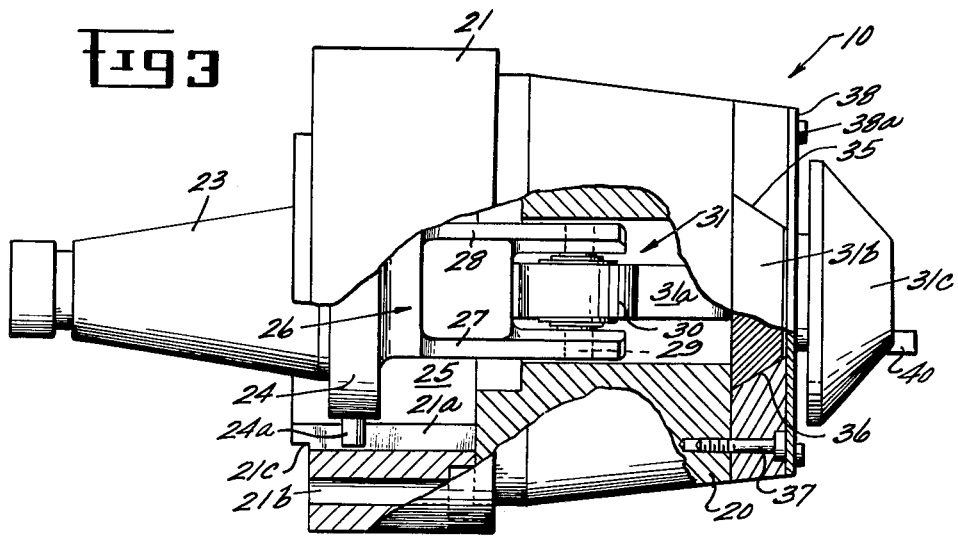
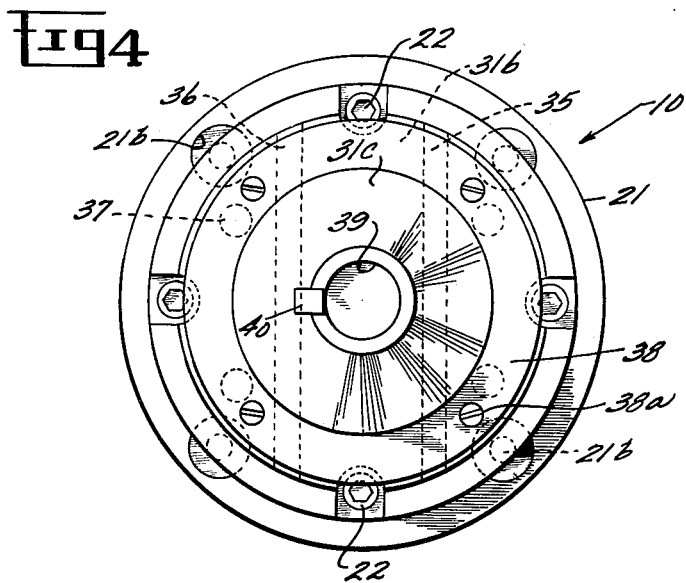

3,228,265
BORING AND FACING TOOL
Robert K. Stoddard, Reading, and John A. Cadwallader, Cincinnati, Ohio, assignors to General Electric Company, a corporation of New York
Filed May 23, 1963, Ser. No. 282,742
3 Claims. (Cl. 77—58)

This invention deals with a boring and facing tool and more specifically with a combination tool which may be used for a boring operation and also be laterally offset to effect a facing operation.

In machining operations it is frequently necessary to perform boring operations and follow this with a machining operation wherein the edges or faces of the bored opening are further machined or undercut in some manner. In the past it has been necessary to set up the workpiece on a boring mill and perform the boring operation, then stop the machining tool and readjust the same tool laterally or change tools for the facing operation. Frequently the workpiece is also set up in different machines for the boring and facing operations, an expensive and time consuming process.

It is accordingly one object of this invention to provide a combination boring and facing tool wherein both the boring and facing operations may be performed by manipulation of the tool through the normal controls of the boring mill.

It is another object of this invention to provide a boring and facing tool capable of differential axial movement between its several component assemblies such that by effecting this movement through the machine tool mechanism the boring tool may be moved laterally to effect a facing operation.

In accordance with one embodiment of the invention there is provided a boring and facing tool comprising inter-fitting shank and housing assemblies which allow differential axial movement therebetween resulting in differential lateral movement between the assemblies, with a tool bit supported from said housing assembly such that by rotation and axial movement of the tool a boring operation is performed and thereafter by differential movement of the shank and housing assemblies the tool bit is moved laterally or off center to contact the side of the bore and effect a facing operation to complete the machining operation.

Other objects and many of the attendant advantages of this invention will be readily appreciated as the same becomes better understood by reference to the following detailed description when considered in connection with the accompanying drawings wherein:

FIG. 1 is a side elevation view of the tool in partial cross-section showing also the tool bit and workpiece, FIG. 2 is a side elevation view of the tool showing the tool bit laterally offset, FIG. 3 is a top elevated view of the tool in partial cross-section, and FIG. 4 is an end view of the tool.

Referring now to the figures a tool 10 for supporting a drill bit 11 is illustrated which may be mounted in any boring machine or horizontal boring mill. As illustrated the drill bit is suitable for drilling a hole through a workpiece 12 by rotation of the bit having a drilling head 13. However frequently it is also necessary to perform a facing operation on the walls of this or other openings for finishing or shaping such walls for final usage. To accomplish this machining operation a rough-cutting tool 14 is mounted on the side of the tool bit 11, a finish-cut bit 15 follows the bit 14 through the opening as the drill bit is moved through the workpiece 12, and a spot facing bit 16 is provided for final shaping of the walls. However, to utilize the spot facing bit 16 the tool bit 11 must be moved laterally with respect to the axis of the opening 12a through the workpiece and the tool 10 allows this precise manipulation of the bit without stopping or otherwise readjusting the workpiece setup.

Turning now to the tool itself, it comprises a housing member 20 with a base ring 21 attached by bolts 22 and a tapered shank assembly 23 positioned for axial movement with respect to the base ring 21 and the housing 20. In this embodiment the tapered shank 23 has a circular cross-section flange 24 which fits within an opening 25 of the base ring 21. A pin 24a fits within the way 21a in the base ring to prevent relative rotation between the base ring 21 and the shank 23. Cam roller support member 26 extends from the tapered shank 23 and has a U shaped section with extending arms 27 and 28 between which is supported a shaft 29 which rotatably supports a roller 30.

Cooperating with the roller 30 is a tool bit support means 31 having a cam member portion 31a including a cam surface 32 extending at an angle with the axis of the tool bit and inter-fitting with the roller 30 in a manner such that by longitudinal movement of the cam roller support 26, the roller 30 will move the support means including cam member portion 31a normal to the axis of the tool holder 10. Attached to the support means 31 is a slide member 31b, wedge-shaped in cross-section as seen in FIG. 3, which extends within the area formed by ways 35 and 36 attached to the housing 20 by bolts 37. Also formed as part of means 31 is a collet 31c having openings 39 into which fits the tool bit 11 which is locked against rotation with respect to the collet 31c by the key 40. Plate 38 fastened to the housing by screws 38a encloses the tool bit support means 31 within the housing 20. The tapered shank 23 is adapted to be supported within a spindle of a boring machine or machining tool (not shown) while the base ring 21 is bolted to the sleeve of the boring machine by bolts extending through countersunk holes 21b and with the tool centered on the machine by the rabbet diameters 21c on the base ring. For a normal boring operation the machine tool sleeve and spindle are rotated together to rotate the tapered shank 23 and base ring 21 and thereby rotate the tool bit 11. Since the machine tool sleeve and spindle are prevented from relative axial, as well as rotational, movement during the boring operation and since base ring 21, housing 20 and tool bit support member 31 must move axially as a unit with the sleeve, cam roller 30 remains in the FIG. 1 position. After the drill head 13 and rough bore bit 14 and finish bit 15 are moved through the workpiece 12 the tool has been advanced to the point where further axial movement of the machine tool sleeve is prevented, at which point the spot facing bit 16 aligns correctly with the workpiece 12 for the facing operation. Thereafter without stopping the operation of the boring machine the spindle of the boring machine may be actuated in the normal manner, i.e., moved axially relative to the sleeve, to move the tapered shank longitudinally with respect to the base ring 21 so that the cam roller 30 forces the tool bit support means 31 laterally of the tool holder 10 as illustrated in FIG. 2. The support means 31 carries with it the collet 31c holding the tool bit 11 thereby offsetting the tool bit with respect to the axis of rotation of the tool 10 causing the spot facing bit 16 to contact the face of the opening in the workpiece 12 as illustrated in FIG. 2. Thus by proper manipulation of the relative axial positions of the spindle and sleeve of the boring machine the tapered shank and base ring of the boring and facing tool are moved differentially in an axial direction to move the spot facing bit 16 laterally and thereby effect the facing operation, all without shutting down the boring machine. Springs 43 may be located within the tool 10 between the cam member portion 31a and the housing 20 to limit any play between the cam member portion 31a and the roller 30. Also stop screws 44 are provided to allow adjustment of the cam member 31a with respect to the housing 20 for proper centering of the tool bit when the tapered shank and base ring are moved differentially to the initial starting position.

It may be seen that both the boring and facing operations may be performed by the subject tool when driven by a standard boring machine, mill or other suitable machine having the usual relatively axially movable spindle and sleeve mechanisms. The use of this tool precludes extra setting-up operations for the workpiece and also precludes stopping the machining operation for adjustment of the tool holder for a facing operation while still allowing for precise continuous feeding of the facing tool into the workpiece by making use of the calibrated feed of the machine.

While particular embodiments of the invention have been illustrated and described it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A boring and facing tool comprising:
   a housing including a base portion having a central opening therethrough;
   a shank assembly tapered at one end, the other end thereof including bifurcated support means, said shank assembly being located within said opening for differential axial movement with respect to said housing;
   a tool bit support member including guide means engaging a groove in said housing for lateral movement of said support member with respect to said housing;
   a cammed surface in said tool bit support member;
   a cam roller supported by said bifurcated means and in engagement with said cammed surface, said cammed surface being at an angle with respect to the tool longitudinal axis wherein by rotation and axial movement of the shank assembly and housing in concert said tool bit support member is advanced to a workpiece for boring same, and by differential axial movement with respect to said housing and rotation of said shank assembly, said tool bit support member is moved laterally of said housing in said groove for facing the workpiece.

2. A boring and facing tool comprising:
   a housing having a central opening therein;
   a shank assembly located within said opening for differential axial movement with respect to said housing;
   a tool bit support member;
   guide means engaging said housing interiorly thereof for sliding lateral movement of said tool bit support member with respect to said housing;
   interengaging cam means on said shank assembly and said tool bit support member, said cam means being completely contained within said housing and comprising a roller and inclined surface on respective ones of said support members and shank assembly, said shank assembly and housing being adapted for connection with a spindle and sleeve, respectively, of a boring machine for concurrent rotation and axial movement therewith to effect a boring operation on a workpiece, and, by further axial movement of the spindle with respect to the sleeve causing relative axial movement between the shank assembly and housing, cooperation of said cam and guide means to effectuate lateral movement of the tool bit support member with respect to the tool longitudinal axis for continuing rotation thereof with the sleeve and spindle in a facing operation on said workpiece.

3. The apparatus as described in claim 2 wherein said guide means comprises a key member integral with said tool bit support member and a pair of ways in said housing forming a groove therebetween, said groove tapering outwardly for slidably retaining said key member therein and running perpendicular to the longitudinal axis of said tool, and a cap member affixed to said housing and enclosing said cam means therewithin.

References Cited by the Examiner

UNITED STATES PATENTS

| | | | |
|---|---|---|---|
| 2,207,067 | 7/1940 | Patscheider | 77—65 |
| 2,350,778 | 6/1944 | Lang. | |
| 2,507,286 | 5/1950 | Trocki. | |
| 2,533,451 | 12/1950 | Ginsburg. | |
| 2,590,068 | 3/1952 | Pekrul. | |
| 2,804,786 | 9/1957 | Stenger. | |
| 3,076,355 | 2/1963 | Heuser. | |
| 3,159,060 | 12/1964 | Miles. | |

WILLIAM W. DYER, JR., *Primary Examiner.*

G. A. DOST, *Assistant Examiner.*